United States Patent [19]
Tuccio

[11] Patent Number: 5,819,104
[45] Date of Patent: Oct. 6, 1998

[54] DISK ARRAY MEMORY SYSTEM HAVING BUS REPEATER AT DISK BACKPLANE

[75] Inventor: William R. Tuccio, Sutton, Mass.

[73] Assignee: EMC Corporation, Hopkinton, Mass.

[21] Appl. No.: 669,592

[22] Filed: Jun. 24, 1996

[51] Int. Cl.$^6$ ................................................. G06F 13/00
[52] U.S. Cl. .................. 395/822; 395/281; 395/287; 395/86; 370/438; 178/71.1; 379/338
[58] Field of Search .................. 178/71.1; 395/281, 395/86, 822, 161, 309, 299; 455/431; 370/438; 372/50

[56] References Cited

U.S. PATENT DOCUMENTS

| | | | |
|---|---|---|---|
| 3,832,489 | 8/1974 | Krishna | 178/71.1 |
| 4,604,689 | 8/1986 | Burger | 395/281 |
| 5,202,593 | 4/1993 | Huang et al. | 326/86 |
| 5,337,413 | 8/1994 | Lui et al. | 395/822 |
| 5,517,714 | 5/1996 | Anderson et al. | 372/50 |
| 5,559,865 | 9/1996 | Gilhousen | 455/431 |
| 5,602,667 | 2/1997 | Patel | 395/161 |
| 5,615,345 | 3/1997 | Wanger | 395/309 |
| 5,621,899 | 4/1997 | Gafford et al. | 395/299 |
| 5,636,214 | 6/1997 | Kranzler et al. | 370/438 |

OTHER PUBLICATIONS

J.M. Delavaux, Y.K. Park, R.E. tench, S. Barski, B. Owen, L.D. Tzeng, and Y. Twu, "1.7Gbit/s, 1.5 micron m Coherent lightwave regenerator", AT&T Bell Laboratories, Aug. 30,1990.

Solve SCSI Problems, Two Sheets, Paralan, no date.

SCSI Repeater Applied Concepts, Two Sheets, Applied Concepts, Inc., no date.

Want to Extend SCSI Bus Length? One Sheet, Paralan, no date.

Disk Devices, EMC$^2$ Symmetrix Product Manual, Feb. 1996, pp. 27–44.

*Primary Examiner*—Thomas G. Black
*Assistant Examiner*—Thuy Pardo
*Attorney, Agent, or Firm*—Wolf, Greenfield & Sacks, P.C.

[57] ABSTRACT

A disk array memory system includes a disk subsystem, a disk director module and a cable connected between the disk subsystem and the disk director module. The disk subsystem includes a disk drive backplane having disk drive connectors interconnected by a first data bus section and disk drives mounted in the disk drive connectors and coupled to the first data bus section. The cable constitutes a second data bus section. The system further includes a bus repeater located in the disk subsystem and including a first port electrically connected to the first data bus section and a second port electrically connected to the cable. The bus repeater logically interconnects the first and second data bus sections and regenerates signals transmitted in either direction between the disk director module and the disk drives. The bus repeater may be implemented as a circuit board mounted in the disk drive backplane or as a module located in close proximity to the disk drive backplane and interconnected to the disk drive backplane.

19 Claims, 5 Drawing Sheets

DISK ARRAY MEMORY SYSTEM HAVING BUS REPEATER AT DISK BACKPLANE

FIELD OF THE INVENTION

This invention relates to interconnection of subsystems in a disk array memory system and, more particularly, to a disk array memory system which utilizes a bus repeater mounted within or in close proximity to a disk backplane for improved communication with a disk director module.

BACKGROUND OF THE INVENTION

Disk array memory systems are used in computer applications which require high capacity online data storage. A disk array memory system includes multiple disk drives, each having a capacity of several gigabytes. The disk drives may be mounted in a disk subsystem, which includes a backplane for interconnecting the disk drives. Banks of disk drives in the disk subsystem are connected by a data bus to a disk director module. The data bus may be a small computer systems interface (SCSI) bus. Each bank may include four or more disk drives connected to a common SCSI bus. A disk director module may control several banks of disk drives, each having a separate SCSI bus. In a typical configuration, the disk drives of a given bank are spaced apart by no more than a few inches on the disk backplane, and the disk director module is connected to the backplane by a cable that may be three or more feet in length. The disk director module and each of the disk drives include SCSI drivers for transmitting and receiving signals on the SCSI bus.

To achieve reliable, error free operation of the disk array memory system, digital signals must be transmitted from the disk director module to the disk drives and from the disk drives to the disk director module at high speed without significant degradation of the signals as to rise and fall times, amplitude, delay, etc. The connection of several disk drives to the data bus within a space of a few inches causes a discontinuity or imbalance in the transmission characteristics of the data bus. As a result, signals transmitted to and from the disk drives may be degraded. The extent of signal degradation is a function of the number of disk drives connected to the data bus and located in close proximity to each other, and the length of the cable between the disk director module and the disk subsystem. As more disk drives are connected to a single data bus, the signal degradation eventually reaches a level which is unacceptable. It is desirable to overcome such signal degradation without modification of the disk drives.

Bus repeaters are devices which regenerate and condition bus signals. Bus repeaters are used to extend the length of a data bus so that devices connected to the bus may be spaced farther apart than is normally permitted. More particularly, a bus repeater may be located at or near the midpoint of a cable which exceeds the maximum allowable cable length in the absence of a bus repeater. Bus repeaters may also be used for isolating devices, so that devices on one side of the bus repeater may be disconnected without affecting devices on the other side.

SUMMARY OF THE INVENTION

According to the present invention, a disk array memory system is provided. The system comprises a disk subsystem, a disk director module and a cable connected between the disk subsystem and the disk director module. The disk subsystem comprises a plurality of disk drives located in close proximity to each other and interconnected by a first data bus section. The disk subsystem typically includes a disk drive backplane having a plurality of disk drive connectors interconnected by the first data bus section. The cable constitutes a second data bus section. The disk array memory system further comprises a bus repeater located in the disk subsystem and including a first port electrically connected to the first data bus section and a second port electrically connected to the cable. The bus repeater logically interconnects the first and second data bus sections and regenerates signals transmitted in either direction between the disk director module and the disk drives. The bus repeater alleviates the degradation of signals that occurs as the result of several closely-spaced disk drives connected to a data bus at the end of a relatively long cable, without requiring modification of the disk drives. The first and second data bus sections typically comprise a small computer systems interface (SCSI) bus.

In a first embodiment, the bus repeater comprises a circuit board mounted in the disk drive backplane. The second port of the bus repeater is connected on the backplane to a cable connector, and the cable is attached to the cable connector. In a second embodiment, the bus repeater comprises a module mounted in close proximity to the disk drive backplane. A jumper cable is connected between the first port of the bus repeater and the disk drive backplane.

According to another aspect of the invention a method for transmitting signals to and between a disk director module and a plurality of disk drives in a disk array memory system is provided. The disk drives are connected to the disk director module by a cable which is long in comparison with a spacing between adjacent disk drives. A bus repeater is located in close proximity to the disk drives. Signals transmitted from the disk director module to each of the disk drives are regenerated by the bus repeater, and signals transmitted from each of the disk drives to the disk director module are regenerated by the bus repeater.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
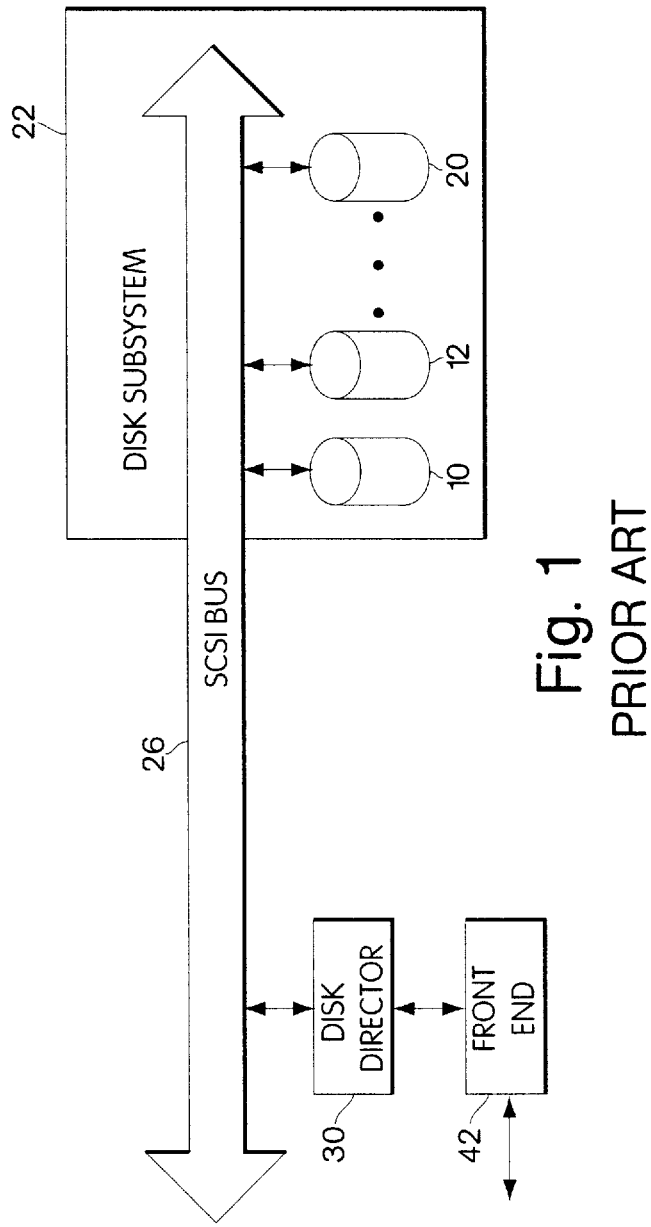
FIG. 1 is a simplified block diagram of a prior art disk array memory system.

An example of a prior art disk array memory system is shown in FIG. 1. Disk drives 10, 12, ... 20 are mounted in a disk subsystem 22. The disk drives plug into connectors in a backplane in disk subsystem 22 and are interconnected by a data bus 26. The data bus 26 may be a small computer systems interface (SCSI) bus, an industry standard data bus configuration. The disk drives 10, 12, ... 20 are interconnected via data bus 26 to a disk director module 30. The disk director module 30 controls operation of each of the disk drives connected to data bus 26. An SCSI bus driver circuit located in disk director module 30 transmits and receives signals on data bus 26. Similarly, each of the disk drives 10, 12, . . . 20 contains an SCSI bus driver circuit for transmitting and receiving signals on data bus 26. The data bus 26 is connected between the disk director module 30 and the backplane in disk subsystem 22 via a cable which, in a typical system, may be three or more feet in length. A front end module 42 interconnects the disk director module 30 to a host computer (not shown). The disk director module 30 may control several banks of disk drives similar to the one shown. An SCSI data bus is connected between each bank of disk drives and the disk director module via a separate cable. A separate SCSI bus is used for each bank of disk drives. A complete system may include several disk director modules, each of which controls several banks of disk drives. An example of such a disk array memory system is the Symmetrix Model 5500 manufactured and sold by EMC Corporation.

Figure 2:
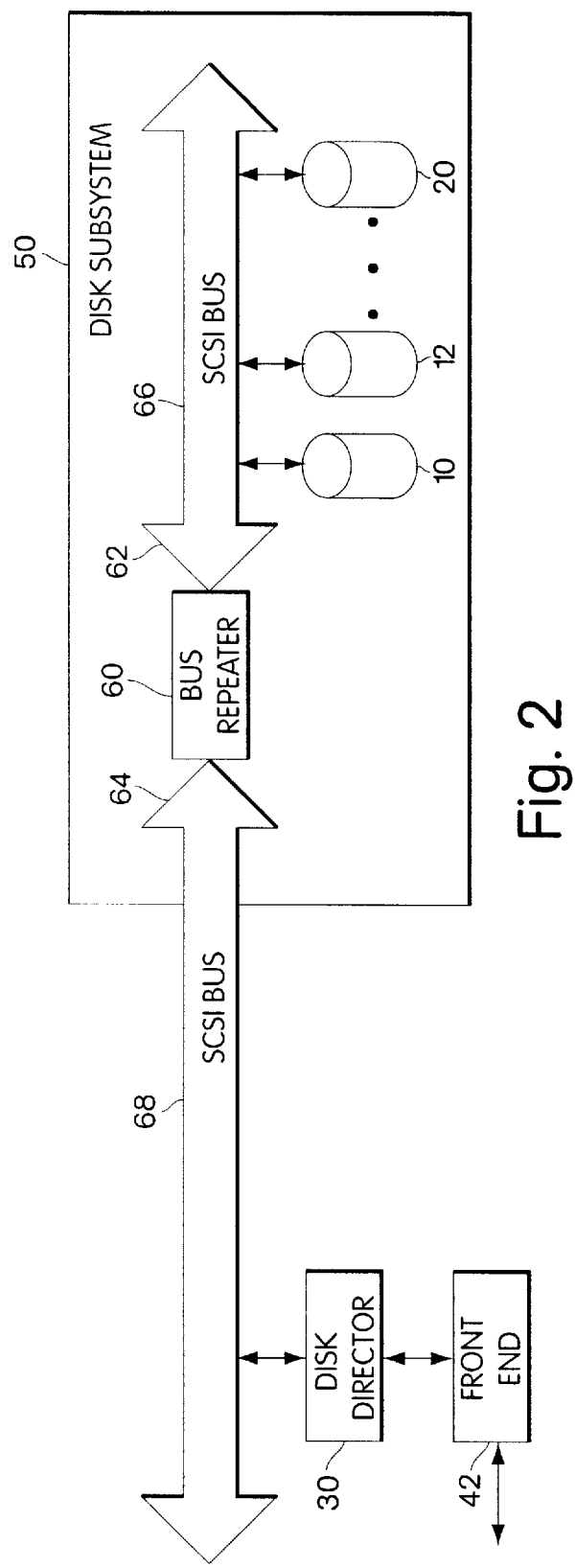
FIG. 2 is a simplified block diagram of a disk array memory system in accordance with the invention.

A block diagram of a disk array memory system in accordance with the present invention is shown in FIG. 2. Like elements in FIGS. 1 and 2 have the same reference numerals. Disk drives 10,12, . . . 20 are mounted in a disk subsystem 50. A data bus, such as an SCSI bus, is divided by a bus repeater 60 into a first data bus section 66 and a second data bus section 68. The first data bus section 66 is connected to a first port 62 of bus repeater 60 and to each of disk drives 10,12, . . . 20. The second data bus section 68 is connected to a second port 64 of bus repeater 60 and is connected to disk director module 30 by a cable that may be three or more feet in length. The first and second data bus sections 66 and 68 are logically interconnected by the bus repeater 60 to form a single data bus. The bus repeater 60 is located in close proximity to the disk drives 10, 12, . . . 20. As discussed below, the bus repeater 60 alleviates the degradation of signals that occurs as the result of several closely-spaced disk drives connected to a data bus at the end of a relatively long cable, without requiring modification of the disk drives.

Figure 3:
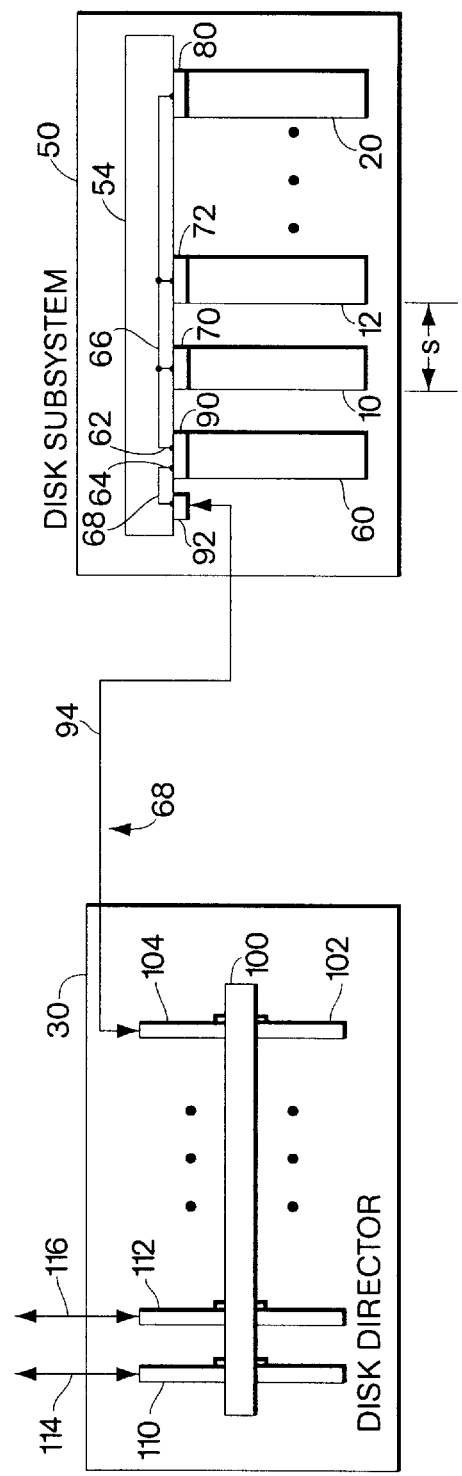
FIG. 3 is a schematic block diagram of a first embodiment of the disk array memory system shown in FIG. 2.

A first embodiment of a disk array memory system in accordance with the invention is shown schematically in FIG. 3. Like elements in FIGS. 2 and 3 have the same reference numerals. The disk subsystem 50 includes a disk drive backplane 54 having disk drive connectors 70, 72, . . . 80 in which the disk drives 10,12, . . . 20 are respectively mounted. The disk drives 10, 12, . . . 20 are interconnected by the data bus section 66, which may be an SCSI bus. As known in the art, a data bus includes multiple conductors and may be connected to several devices in parallel. Each of the devices may transmit and receive signals on the data bus according to a predetermined protocol. The bus connections between disk drives are made by conductors on the backplane 54. In a typical configuration, a spacing S between adjacent disk drives on backplane 54 may be about two inches. The disk drive backplane 54 may be designed to accommodate four or more disk drives, with adjacent disk drives spaced apart by distances on the order of about two inches.

The bus repeater 60 is mounted within or in close proximity to backplane 54. In the embodiment of FIG. 3, the bus repeater 60 is configured as a module, such as a circuit board, that is mounted in backplane 54 via a backplane connector 90. First port 62 of bus repeater 60 is connected to the first data bus section 66 on backplane 54, and second port 64 is connected via conductors on backplane 54 to a backplane connector 92. A cable 94 is connected between connector 92 and disk director module 30. The cable 94 implements the second data bus section 68 shown in FIG. 2 and is typically three or more feet in length. The conductors on backplane 54 which interconnect second port 64 of bus repeater 60 and connector 92 are part of second bus section 68. Each of the ports 62 and 64 of bus repeater 60 provides a connection for the data bus. Cable 94 provides a bus connection between the disk drive subsystem 50 and the disk director module 30. In particular, the cable 94 electrically interconnects bus repeater 60 and the bus driver in disk director module 30.

The disk director module 30 may include a disk director backplane 100 in which disk director boards are mounted. In a preferred embodiment, each disk director board is configured as a main board 102 and adapter board 104. The cable 94 may be connected to a connector located on adapter board 104. As noted above, other disk director boards 110 and 112 in the disk director module 30 may be connected by separate data buses 114 and 116 to other banks of disk drives (not shown).

The function of the bus repeater 60 is to regenerate signals transmitted from the disk director module 30 to each of the disk drives 10, 12, . . . 20 and to regenerate signals transmitted from each of the disk drives 10,12, . . . 20 to the disk director module 30. Signals received at each port 62, 64 are regenerated and then transmitted from the other port. The bus repeater 60 is logically transparent to the disk director module 30 and to the disk drives 10, 12, . . . 20, so that the data bus section 66 on backplane 54, data bus section 68, implemented as cable 94, and bus repeater 60 constitute a single data bus connection between disk director module 30 and disk drives 10, 12, . . . 20. As noted above, the cable 94 may be three or more feet in length, while the spacing S between adjacent disk drives may be on the order of about two inches. The bus repeater 60 is preferably located as close as is practical to the disk drives 10,12, . . . 20. Thus, the bus repeater 60 is physically and electrically located near the disk drive end of the data bus which extends from the disk director module 30 to several closely-spaced disk drives. The bus repeater 60 alleviates the degradation of signals that occurs as a result of several of closely-spaced disk drives connected to a data bus at the end of cable 94, without requiring modification of the disk drives. An example of a suitable bus repeater is the model SIR-S17 or SIR-S16 available from Paralan.

Figure 4:
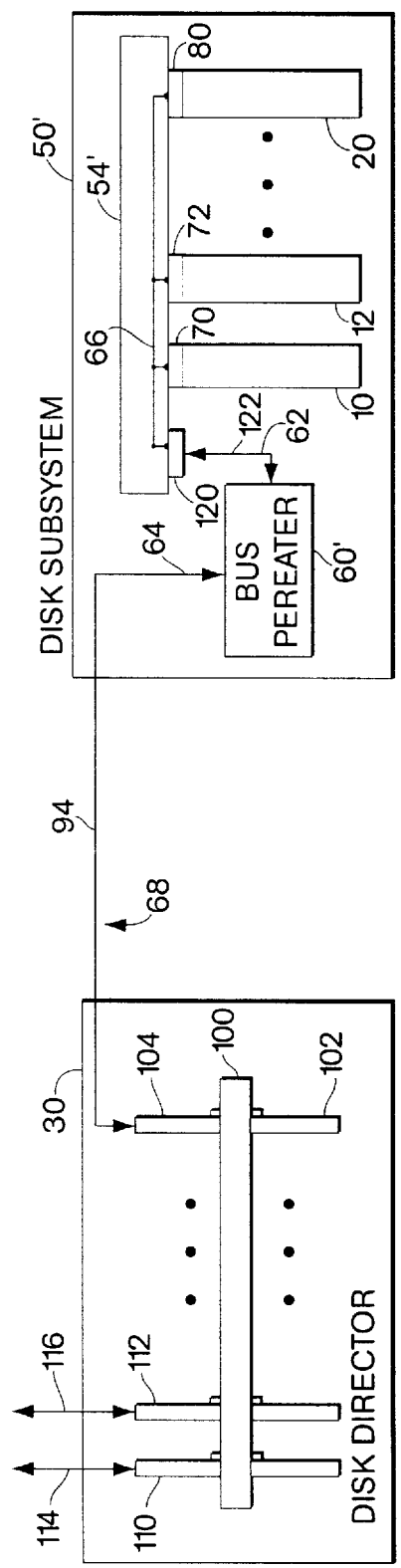
FIG. 4 is a schematic block diagram of a second embodiment of the disk array memory system shown in FIG. 2.

A second embodiment of a disk array memory system in accordance with the invention is shown schematically in FIG. 4. Like elements in FIGS. 3 and 4 have the same reference numerals. A disk subsystem 50' includes a disk drive backplane 54' having disk drive connectors 70, 72, . . . 80 in which the disk drives 10, 12, . . . 20 are respectively mounted. The disk drives 10, 12, . . . 20 are interconnected on backplane 54' by first data bus section 66. The data bus section 66 is connected to a backplane connector 120. A bus repeater 60' is located externally of backplane 54' but is located as close as is practical to backplane 54'. A short jumper cable 122 is connected between first port 62 of bus repeater 60' and backplane connector 120. The cable 94 is connected between disk director module 30 and the second port 64 of bus repeater 60'. The bus repeater 60' functions in the same manner as the bus repeater 60 shown in FIGS. 2 and 3 and described above. In particular, the bus repeater 60' regenerates signals transmitted from the disk director module 30 to each of the disk drives 10,12, . . . 20 and regenerates signals transmitted from each of the disk drives 10, 12, . . . 20 to the disk director module 30.

In a preferred embodiment, the bus repeater 60, 60' is "hot pluggable" in the disk array memory system. This means that the bus repeater can be unplugged from the system, for example for repair or replacement, while the system power is on. The removal of the bus repeater disrupts communication between disk director module 30 and disk drives 10,12, . . . 20. However, the system remains in operation, because other banks of disk drives connected to the disk director module 30 remain in operation and perform the functions which would have been performed by the disk drives 10, 12, . . . 20. Techniques for operating in this manner are known to those skilled in the art.

Figure 5:
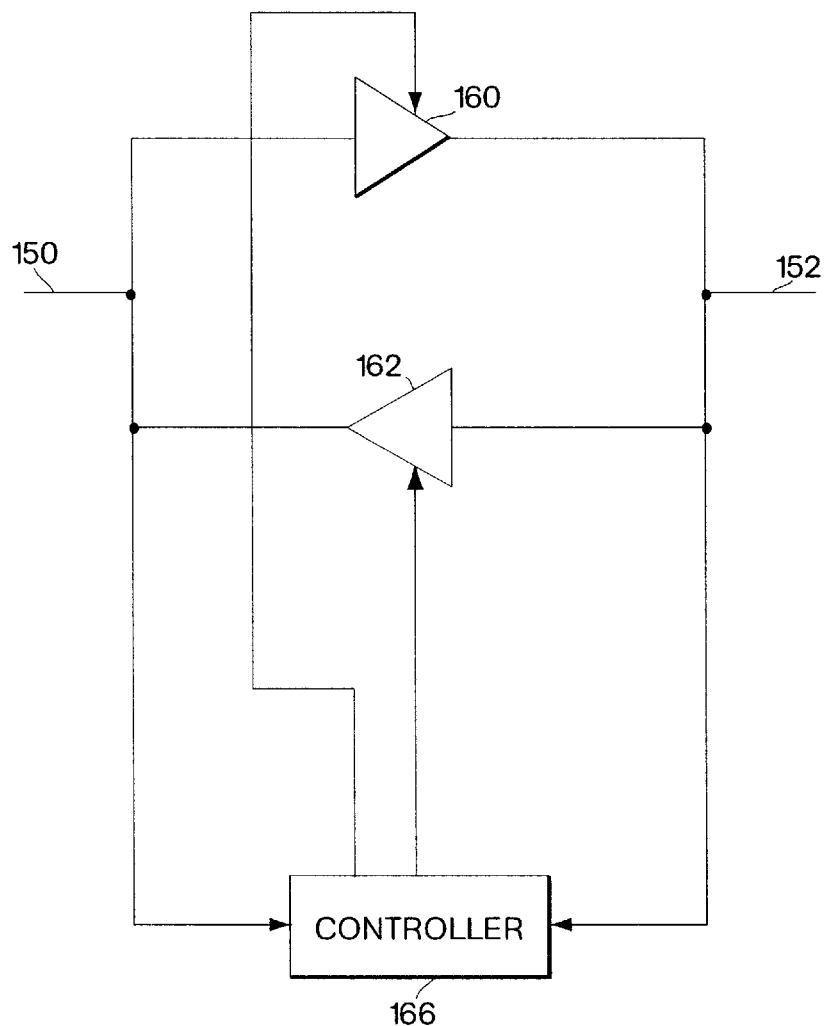
FIG. 5 is a partial block diagram of the bus repeater shown in FIGS. 2–4.

A block diagram that illustrates the structure and operation of the bus repeater 60, 60' is shown in FIG. 5. As indicated above, the data bus sections 66 and 68 include multiple conductors, only one of which is shown in FIG. 5. A conventional wide SCSI bus has 27 conductors. A conductor 150 of the SCSI bus is connected via bus section 68, implemented as cable 94, to disk director module 30. A conductor 152 of the SCSI bus section 66 is connected via backplane 54, 54' to each of the disk drives 10, 12, . . . 20. The SCSI bus is bidirectional in that signals may be transmitted either from the disk director module 30 to the disk drives, or from each of the disk drives to the disk director module 30. The bus repeater 60 includes a driver 160 for regenerating signals sent from the disk director module to the disk drives and a driver 162 for regenerating signals transmitted from each of the disk drives to the disk director module. Driver circuits suitable for regeneration of data bus signals are known to those skilled in the art. The signals are typically restored to their full amplitude and specified rise and fall times without otherwise affecting the signal characteristics. Furthermore, the relative timing between adjacent conductors of the data bus is not altered. A controller 166 senses the signals on conductors 150 and 152 and determines the direction of signal transmission. Depending on the direction of signal transmission, one of the drivers 160 or 162 is enabled. The controller 166 may, for example, be a microcontroller that senses the direction of transmission on each of the conductors of the data bus.

The present invention has been described in connection with an SCSI bus. However, the invention may be implemented with other bus configurations.

While there have been shown and described what are at present considered the preferred embodiments of the present invention, it will be obvious to those skilled in the art that various changes and modifications may be made therein without departing from the scope of the invention as defined by the appended claims.

I claim:

1. A disk array memory system comprising:
   a disk subsystem comprising a disk drive backplane having a plurality of disk drive connectors interconnected by a first data bus section and plural disk drives mounted in said disk drive connectors and coupled to said first data bus section;
   a disk director module for controlling said disk drives;
   a cable connected between said disk subsystem and said disk director module, said cable comprising a second data bus section connected to said disk director module without a bus repeater; and
   a bus repeater located in said disk subsystem and including a first port electrically connected to said first data bus section and a second port electrically connected to said cable, wherein said bus repeater logically interconnects said first and second data bus sections regenerates signals transmitted in either direction between said disk director module and said disk drives and limits degradation of said signals that would otherwise be caused by said plural disk drives in the absence of said bus repeater.

2. A disk array memory system as defined in claim 1 wherein said first and second data bus sections comprise a small computer systems interface (SCSI) bus.

3. A disk array memory system as defined in claim 1 wherein said cable is at least three feet in length.

4. A disk array memory system as defined in claim 1 including four or more of said disk drives.

5. A disk array memory system as defined in claim 1 wherein said bus repeater includes means for sensing a direction of each signal transmitted between said disk director module and said disk drives.

6. A disk array memory system as defined in claim 1 wherein said bus repeater comprises a circuit board mounted in said disk drive backplane.

7. A disk array memory system as defined in claim 6 wherein the second port of said bus repeater is connected on said backplane to a cable connector and wherein said cable is connected to said cable connector.

8. The disk array memory system as defined in claim 1 wherein said bus repeater comprises a module mounted in close proximity to said disk drive backplane and wherein a jumper cable is connected between the first port of said bus repeater and said disk drive backplane.

9. A disk array memory system as defined in claim 1 wherein said cable is long in comparison with a spacing between adjacent ones of said disk drives.

10. A disk array memory system comprising:
    a disk subsystem comprising a plurality of disk drives located in close proximity to each other and interconnected by a first data bus section;
    a disk director module for controlling said plurality of disk drives;
    a cable connected between said disk subsystem and said disk director module, said cable comprising a second data bus section connected to said disk director without a bus repeater, said cable having a length that is large in comparison to a spacing between adjacent ones of said plurality of disk drives; and
    a bus repeater located in said disk subsystem in close proximity to said plurality of disk drives and including a first port electrically connected to said first data bus section and a second port electrically to said cable, wherein said bus repeater logically interconnects said first and second data bus sections regenerates signals transmitted in either direction between said disk director module and said disk drives and limits degradation of said signals that would otherwise be caused by said plurality of disk drives in the absence of said bus repeater.

11. A disk array memory system as defined in claim 10 wherein said first and second data bus sections comprise a small computer systems interface (SCSI) bus.

12. A disk array memory system as defined in claim 10 wherein said disk drives comprise at least four closely-spaced disk drives interconnected by said first data bus section.

13. A method for transmitting signals to and between a disk director module and a plurality of disk drives in a disk array memory system, said disk drives being interconnected to said disk director module by a cable which carries a data bus and which is long in comparison with a spacing between adjacent ones of said plurality of disk drives, comprising the steps of:
    providing a bus repeater located in close proximity to said plurality of disk drives and connected to one end of said cable;

connecting the other end of said cable to said disk director module without using a bus repeater;

regenerating signals transmitted on said data bus from said disk director module to each of said plurality of disk drives with said bus repeater so as to limit degradation of said signals that would otherwise be caused by said plurality of disk drives in the absence of said bus repeater; and regenerating signals transmitted on said data bus from each of said plurality of disk drives to said disk director module with said bus repeater so as to limit degradation of said signals that would otherwise be caused by said plurality of disk drives in the absence of said bus repeater.

14. A method as defined in claim 13 wherein the step of providing said bus repeater comprises mounting said bus repeater and said plurality of disk drives in a disk drive backplane.

15. A disk array memory system comprising:

a disk drive backplane having a plurality of disk drives connectors interconnected by a first data bus section and plural disk drives mounted in said disk drive connectors and coupled to said first data bus section;

a disk director module for controlling said disk drives;

a cable connected between said disk subsystem and said disk director module, said cable comprising a second data bus section connected to said disk director module without a bus repeater; and repeater means located in said disk subsystem and electrically coupled between said first data bus section and said cable for logically interconnecting said first and second data bus sections, for regenerating signals transmitted in either direction between said disk director module and said disk drives and for limiting degradation of said signals that would otherwise be caused by said disk drives in the absence of said repeater means.

16. A disk array memory system as defined in claim 15 wherein said first and second data bus sections comprise a small computer systems interface (SCSI) bus.

17. A disk array memory system as defined in claim 15 wherein said repeater means comprises a circuit board mounted in said disk drive backplane.

18. A disk array memory system as defined in claim 15 wherein said repeater means comprises a module located in close proximity to said disk drive backplane and interconnected to said disk drive backplane by a jumper cable.

19. A disk array memory system as defined in claim 15 wherein said cable is long in comparison with a spacing between adjacent ones of said disk drives.

* * * * *